(12) United States Patent
Shrivastava et al.

(10) Patent No.: US 11,829,855 B2
(45) Date of Patent: *Nov. 28, 2023

(54) TIME-FACTORED PERFORMANCE PREDICTION

(71) Applicant: Microsoft Technology Licensing, LLC, Redmond, WA (US)

(72) Inventors: Mayank Shrivastava, Bellevue, WA (US); Hui Zhou, San Francisco, CA (US); Pushpraj Shukla, Dublin, CA (US); Emre Hamit Kok, Kirkland, WA (US); Sonal Prakash Mane, Redmond, WA (US); Dimitrios Brisimitzis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/824,312

(22) Filed: May 25, 2022

(65) Prior Publication Data

US 2022/0284350 A1    Sep. 8, 2022

Related U.S. Application Data

(63) Continuation of application No. 16/004,096, filed on Jun. 8, 2018, now Pat. No. 11,361,244.

(51) Int. Cl.
*G06N 5/022* (2023.01)
*G06N 20/00* (2019.01)
*G06F 16/903* (2019.01)

(52) U.S. Cl.
CPC ....... *G06N 20/00* (2019.01); *G06F 16/90335* (2019.01); *G06N 5/022* (2013.01)

(58) Field of Classification Search
None
See application file for complete search history.

(56) References Cited

U.S. PATENT DOCUMENTS 10,671,931 B2 * 6/2020 Bansal .................... G06N 20/00
10,867,421 B2 * 12/2020 Garvey ................... G06F 21/55
(Continued)

OTHER PUBLICATIONS

Tian et al. "Incorporating seasonal time series analysis with search behavior information in sales forecasting". In Proceedings of the 21st International Conference on World Wide Web (WWW '12 Companion). Association for Computing Machine (Year: 2012).*
(Continued)

*Primary Examiner* — Li B. Zhen
*Assistant Examiner* — Leah M Feitl
(74) *Attorney, Agent, or Firm* — Holzer Patel Drennan

(57) ABSTRACT

Training query intents are allocated for multiple training entities into training time intervals in a time series based on a corresponding query intent time for each training query intent. Training performance results for the multiple training entities are allocated into the training time intervals in the time series based on a corresponding performance time of each training performance result. A machine learning model for a training milestone of the time series is trained based on the training query intents allocated to a training time interval prior to the training milestone and the training performance results allocated to a training time interval after the training milestone. Target performance for the target entity for an interval after a target milestone in the time series is predicted by inputting to the trained machine learning model target query intents allocated to the target entity in a target time interval before the target milestone.

17 Claims, 6 Drawing Sheets

(56) References Cited

U.S. PATENT DOCUMENTS

| | | | |
|---|---|---|---|
| 11,093,837 B2* | 8/2021 | Oliner | G06N 20/00 |
| 2010/0241647 A1 | 9/2010 | Ntoulas et al. | |
| 2011/0314011 A1* | 12/2011 | Buehrer | G06F 16/951 |
| | | | 707/769 |
| 2013/0138577 A1 | 5/2013 | Sisk | |
| 2015/0310097 A1 | 10/2015 | Achuthan et al. | |
| 2016/0335678 A1 | 11/2016 | Kota et al. | |
| 2017/0024656 A1 | 1/2017 | Gilon et al. | |
| 2017/0220939 A1 | 8/2017 | Bansal et al. | |
| 2017/0308986 A1* | 10/2017 | Simpson | G06F 40/30 |
| 2018/0046926 A1* | 2/2018 | Achin | G06N 20/20 |
| 2018/0260704 A1* | 9/2018 | Sun | G06N 3/0454 |
| 2019/0378048 A1 | 12/2019 | Shrivastava et al. | |

OTHER PUBLICATIONS

Shrivastava, Mayank, et al. "Forecasting Sales of Consumer Devices Using Search Query Data." (2016). (Year: 2016).*

Zhang et al. "Learning-based SPARQL query performance modeling and prediction". World Wide Web 21, 1015-1035. Published online Oct. 24, 2017. https://doi.org/10.1007/s11280-017-0498-1 (Year: 2017).*

Li et al., "Learning with click graph for query intent classification", ACM Transactions on Information Systems, vol. 28, Issue 3, Article No. 12 pp. 1-20, https://doi.org/10.1145/1777432.1777435 (Year: 2010).*

Fujita et al., "Click-graph modeling for facet attribute estimation of web search queries", RIAO '10: Adaptivity, Personalization and Fusion of Heterogeneous Information, Apr. 2010 pp. 190-197 (Year: 2010).*

Celikyilmaz et al., "Leveraging Web Query Logs to Learn User Intent Via Bayesian Latent Variable Model", ICML Workshop on Combining Learning Strategies to Reduce Label Cost, Jul. 2011 (Year: 2011).*

Hasan et al., "A Machine Learning Approach to SPARQL Query Performance Prediction", 2014 IEEE/WIC/ACM International Joint Conferences on Web Intelligence (WI) and Intelligent Agent Technologies (IAT) (Year: 2014).

Zhang et al., "Learning-based SPARQL query performance modeling and prediction", Oct. 24, 2017 Springer Science+ Business Media, LLC (Year: 2017).

* cited by examiner

TIME-FACTORED PERFORMANCE PREDICTION

CROSS-REFERENCE TO RELATED APPLICATIONS

The present application is a Continuation of and claims benefit of priority to U.S. patent application Ser. No. 16/004,096, filed Jun. 8, 2018, entitled "TIME-FACTORED PERFORMANCE PREDICTION," which is specifically incorporated by reference for all that it discloses and teaches.

BACKGROUND

Performance prediction is a very subjective endeavor. The selection of performance-influencing factors and the importance assigned to those factors are among the parameters that can vary from analyst to analyst, from case to case, and from industry to industry. In addition, the effort to identify, collect, and analyze performance-related data is labor-intensive, and therefore, difficult to scale. Accordingly, these factors limit the amount and effectiveness of data used for performance prediction in many domains.

For example, when analysts attempt to identify start-up companies that are likely to succeed, one analyst may subjectively place more importance on the business school attended by the founder than another analyst who places more importance on the founder's past success rate. How these analysts incorporate other factors, including the timing and magnitude of funding rounds, the profiles of the start-up's competitors, and market conditions can vary dramatically from analyst to analyst and lead to very different conclusions. In another example, when analysts attempt to forecast the likelihood of success of a new product being introduced to the market, one analyst may subjectively place more importance on the timing and expense of marketing efforts than another analyst who places more importance on the number of competing products in the market. How these analysts incorporate other factors, including the differentiating product features, price, margin, the supply chain, and market conditions can vary dramatically from analyst to analyst and also lead to very different conclusions. In both examples, the amount of data collected and analyzed tends to be constrained by the subjective and labor-intensive nature of the analysis. Thus, existing performance prediction techniques lack reliability and scalability.

SUMMARY

The described technology provides prediction of performance of a target entity using a machine learning model. Training query intents generated from a query-URL click graph are allocated for multiple training entities into training time intervals in a time series based on a corresponding query intent time for each training query intent. The training time intervals in the time series are separated by training milestones in the time series. Training performance results for the multiple training entities are allocated into the training time intervals in the time series based on a corresponding performance time of each training performance result. The machine learning model for a training milestone of the time series is trained based on the training query intents allocated to a training time interval prior to the training milestone and the training performance results allocated to a training time interval after the training milestone. Target query intents generated from the query-URL click graph for the target entity are allocated into target time intervals based on a corresponding query intent time for each target query intent. The target time intervals in the time series are separated by target milestones in the time series. A prediction of a target performance result for the target entity for an interval after a target milestone in the time series is generated by inputting to the trained machine learning model target query intents allocated to the target entity in a target time interval before the target milestone.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
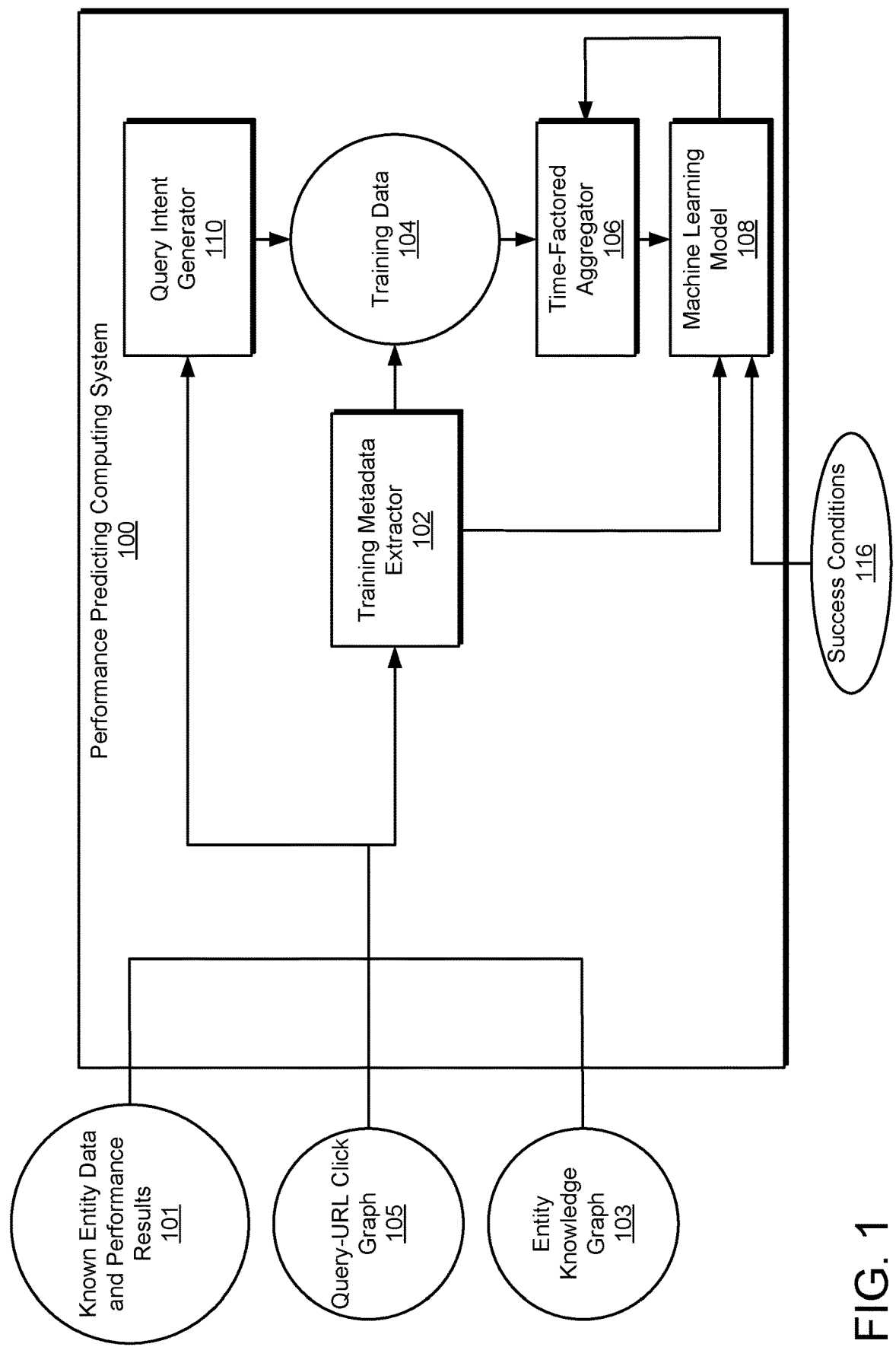
FIG. 1 illustrates a training stage of an example performance prediction computing system.

Performance prediction, as described herein, may be applied to many, diverse domains, including start-up company success predictions, product sales forecasts, sports team competitions, emergency response strategies, designs of experiments, movie and television series success, horse racing results, and many other domains. By training a machine learning model for a particular domain (and even a specific problem within that domain) using subject data for similar entities and their associated performance results, a performance prediction system can then input to that machine learning model relevant subject data for a target entity to predict a likelihood of successful performance by that target entity. For example, when attempting to predict performance of a start-up company, a performance prediction system trains a machine learning model using subject data of similar companies (e.g., competitors, non-competing companies in the same industry) and their corresponding performance results (e.g., revenue histories, acquisition values). Having trained the machine learning model using these similar entities, the performance prediction system can input subject data for the target entity and output a confidence score characterizing a predicted likelihood of success of the target entity.

One aspect of such a performance prediction system is to define success conditions that can define which performance results are to be classified as a success or failure and when the decision of success or failure is to be made. For example, if the performance metric of interest for a start-up company is acquisition value, then the performance prediction is based on whether the target entity will be acquired at or above a specified acquisition price within a given time frame (e.g., within two years). In contrast, if the performance metric of interest for a new product is quarterly sales revenue, then the performance prediction is based on whether the target entity will achieve a specified level of quarterly sales revenue within a given time frame (e.g., within 18 months). By labeling the training entity performance results according to a specified success condition, the machine learning model may be trained to predict the likelihood of the target entity satisfying that success condition.

Machine learning refers to statistical computational techniques intended to allow a computer to progressively improve its performance on a specific task. In machine learning, classification refers to identifying to which set of a set of categories a new observation belongs, on the basis of a training data set containing observations for which the categories of membership are already known (or "labeled"). An unlabeled observation refers to an observation for which the category of membership is unknown. Labeled observations may include or be stored in association with metadata that particularly identifies the category attributed to the observation. When machine learning is applied to performance prediction about a target entity, a machine learning model is trained using training data of similar entities (e.g., companies or products) and, rather than strictly relying on static programming instructions to generate a prediction, the machine learning model makes data-driven decisions based on the training data ("labeled observations") and applied to input data about a target entity ("unlabeled observations").

Manual performance prediction processes are problematic in that they are founded primarily on subjective selection of a limited set of training entities, training data, and biased emphasis on one set of factors over another. The described technology provides a more scalable and objective approach by collecting large volumes of data (e.g., from a query-URL click graph and entity knowledge graphs), selecting relevant training entities based on this data, extracting relevant training data based on this data, and extracting query intents for a target entity based on this data. Furthermore, subjectivity is reduced by allowing the machine learning model to learn the relationships based on the training data and the success conditions, rather than relying on an analyst's intuition and experience about which factors might be more influential to performance. In this manner, the machine learning model provides a dramatic improvement in performance prediction systems.

FIG. 1 illustrates a training stage of an example performance prediction computing system 100. The performance prediction computing system 100 is configured to training a machine learning model to predict performance (e.g., profit, market capture, product sales performance, sports team performance in a tournament) of a target entity (e.g., a company, a product, a sports team) based on training data obtained from an arbitrary number of other ("training") entities in the same or similar domain. For example, to train a machine learning model to predict success of a start-up company, training data is selected from other start-up companies having similar characteristics (e.g., similar products or services, similar technologies, similar high-level business plans, similar geographical regions). The training data itself can include a wide variety of known entity data (e.g., investment histories, management personnel timing, marketing histories, Web searches, Twitter references, news references), query intents relating to the training entities, and available performance results (e.g., revenue histories, expense histories, investment timelines, acquisition value). In contrast, to train a machine learning model to predict success of a new product, training data is selected from other products having similar characteristics (e.g., similar products, similar markets). The training data itself can include a wide variety of known entity data (e.g., marketing histories, distribution channels schedules, product reviews), query intents relating to the training products, and available performance results (e.g., quarterly product sales results, product adoption timelines). The entity data, the query intents, and performance results may include time-dependent data, including without limitation the timing of investment rounds, the timing of marketing efforts, and quarterly sales figures.

When initiating a performance prediction process, the performance prediction computing system 100 receives an identification of a "target entity," the entity for which a performance prediction is requested, and initiates a training entity selection phase. The performance prediction computing system 100 identifies appropriate training entities by first collecting domain data, such as from the Web, other public or private data repositories, news sources, libraries, etc., about the target entity and about other entities in the same or similar domain. In one implementation, the domain data includes domain-specific data about identified entities, which may be initially identified by manual and/or automated techniques. Automated techniques may also be used to expand the number of known entities, such as by searching one or more data sources for similarly classified or otherwise related or similar entities to the initially identified entities.

Based on the collected domain data on the known entities, the performance prediction computing system 100 selects individual entities that satisfy a training entity selection condition. The training entity selection condition is set to identify entities bearing relevant similarities to the target entity and designate them as "training entities" in the performance prediction for the target entity. The training entity selection condition can include without limitation criteria relating to domain classifications (e.g., industry or product categorizations), news and social media co-occurrences (e.g., references to companies or products in the same article, tweet, post, website, news cycle, new program), and semantic similarity among phrases, sentences, and paragraphs of text referencing the entities and their characteristics (e.g., product types, product launch schedules, age and education of company founders, investor identities). Furthermore, the training entity selection condition may also depend on the availability of entity data and corresponding performance results that are relevant to performance of the entity—if sufficient entity data and performance results are not available for an entity, that entity may not be selected as a training entity. Accordingly, the performance prediction computing system 100 selects the entities satisfying the training entity selection condition as training entities.

In one implementation, for example, semantic similarity between different text may be analyzed by generating a high-multi-dimensional vector representation of the text being analyzed and calculating a similarity metric (e.g., a cosine similarity metric) between any two such vector representations. Entities associated with text having similarity metrics satisfying a text similarity condition (e.g., a similarity metric exceeds a similarity threshold) relative to the target entity may be identified as training entities satisfying the training entity selection condition, although other selection factors and conditions, including without limitation those mentioned above, may also be considered.

Having identified training entities, the performance prediction computing system 100 initiates a training data collection phase in which a training metadata extractor 102 collects (e.g., from known entity data and performance results 101, a query-URL click graph 105, and/or an entity knowledge graph 103) relevant training data 104 on the selected training entities. The known entity data and performance results 101 includes entity data, such as entity names and entity descriptors (e.g., company profile, product specifications) and performance data, both pertaining to the potential training entities. Such data may be accumulated by both manual and automated means and may include entities associated with a domain. For example, if the performance prediction system is configured to predict sales performance of a new car model, the entities may include Audi, Ford, and Toyota and various models and styles of the products previously sold by these car companies.

In machine learning, the training data 104 are referred to as labeled observations. Some of the known entity data and performance results 101 may have already been collected during the training entity selection phase described above, using similar data sources and analysis techniques. An example method of collecting and processing training data for implementations of the described performance prediction, the observations can include entity characteristics (e.g., product types, marketing events, company funding events, founder identities) and query intents relating to the training entities, and the labels can include performance metrics (e.g., product sales, acquisition values, investment ranges) for those training entities.

Multiple data sources are leveraged to provide performance prediction in one or more of the described implementations. One such data source includes a semantic entity knowledge graph 103 of one or more large document collections, such as a knowledge graph of the World Wide Web, an enterprise data repository, a document library, etc. An entity knowledge graph 103 stores one or more domain-specific schemas (ontologies), which organize information into data and knowledge. Such ontologies generally encompass structured and unstructured data, representing entities, ideas, and events, with their interdependent properties and relationships, based on a system of categories. As such, a domain knowledge graph stores repositories of semantically-rich encoded information and organizes the information pertaining to a given domain. For example, if the performance prediction system is configured to predict sales performance of a new car model, the knowledge graph will include relationships and attributes of different entities, such as an entity "Camry" of make "Toyota" and production year 2015.

Another data source includes a query-URL click graph 105, where an edge indicates that a document (e.g., designated by a URL) was selected (e.g., "clicked") for a query during a user's Web browsing activity. When a user types or otherwise invokes a query in a browsing session and then selects a search result, a query-URL association is created. By logging a large number of click events, the search engine can accumulate a large number of query-URL pairs into a query-URL click graph, where each query is adjacent to one or more URLs, and each URL is adjacent to one or more queries. The query-URL click graph, therefore, provides a description of aggregated user activity relating queries to documents (e.g., identified by URLs). In some implementations, the query-URL click graph may also include additional metadata associated with each query, such as the geographical location from which the query and/or URL click was executed, the of the computing device through which the query and/or URL click was executed, etc.

The training data 104 includes entity metadata and query intents obtained as "observations" about the identified training subjects. Entity metadata may be provided or extracted by the training metadata extractor 102 from the known entity data and performance results 101 or from metadata of an entity knowledge graph 103, a query-URL click graph 105. Examples of entity metadata for analysis of a start-up company may include without limitation names of vendors, competitors, and/or customers of training entities, time and locations of queries relating to the training entities, and relationships between the training entities and other entities. The training data 104 may also be time-dependent or time-independent, and time-dependent data may be distributed relative to training milestones along a timeline or time series for input to the machine-learning model. Example milestones and their contributions to the machine learning model 108 are discussed below.

Query intents may be extracted largely from the query-URL click graph 105 by a query intent generator 110, although other information may be used to supplement the query-URL click graph 105. Query intent generation is described in more detail with regard to FIGS. 2-5, but it applies to both the training stage and the prediction phase of the described technology.

The training data 104 also includes performance results (or a metric characterizing whether and/or by how much certain performance results satisfy "success condition") obtained as "labels" (see success conditions 116 that are input to the machine learning model 108). For example, product sales revenue for the fourth quarter of a year may be used as a label for a product training entity in training a machine learning model. In another example, whether the product sales revenue for the fourth quarter of a year met company predictions or market expectations may also be used as a label for a product training entity in training a machine learning model. The machine learning model 108 is training using the training data, including performance results, based on how well the training entities perform relative to the success conditions 116. It should be understood that there may be multiple success conditions for each training entity and indeed for each milestone of a training entity.

Many training data observations and labels are time-dependent, such that the entity data, query intents, and/or performance results are associated with a time of occurrence. As such, the training data 104 can be distributed along a timeline or a time series according to the occurrence time. The training data 104 may, therefore, be allocated into intervals of the time series associated with the corresponding entity. The time-factored aggregator 106 collects entity data and performance results into discrete intervals separated by milestones based on the timing of the entity data and the performance results. For example, if the specified success condition identifies a sales revenue level for a target product, then the training data 104 may include marketing dollars spent on the target product during the first quarter of the year and the corresponding sales revenue for that target product during the subsequent quart of the year. Accordingly, the performance predicting computing system 100 may allocate the training data 104 into intervals of a time series associated with the corresponding entity and use the time-factored training data to train the machine learning model 108.

In the case of the training stage, the training data 104 is allocated into training intervals of a time series, where the training intervals are separated by training milestones. Example training milestones may include without limitation funding events, product launches, marketing efforts, personnel changes, and market events. As shown in FIG. 1, extracted entity metadata may also be used to train the machine learning model 108, without time-factoring. The extracted entity metadata may be time-dependent or time-independent. For example, time-independent properties, such as a category and/or a type of company, product, industry, model, geography, etc., can be input directly to the machine learning model 108 without time-factoring by the time-factored aggregator 106.

Aggregation and training of the model can iterate among different intervals and different training entities, as shown in FIG. 1 by the recursive arrow connecting back to the time-factored aggregator 106. Using this iterating technique, the machine learning model 108 can be trained using pre-milestone entity data ("observations") and post-milestone performance results ("labels") for a sequence of milestones in a time series. For example, in the case of predicting sales performance of a target product, data elements such as the time since product launch, the timing and magnitude of marketing expenditures, the contemporaneous announcement and release of competing or supporting products, and the timing and perspective of product reviews and consumer reactions in one quarter may be relevant influencers of product performance in a future quarter.

In one implementation, the milestones may be periodic, such as weeks, days, and/or annual quarters. In another implementation, the milestones may be dependent upon occurrences of particular events, such as funding rounds, product launches, personnel changes, athletic injuries, release of a promotional trailer for a movie or television series, and economic condition changes. Other milestone types may be employed, and different types of milestones may be used in the same implementation to predict performance of a target entity. Accordingly, the time-factored aggregator 106 may, based on the timing of the related event or date, allocate the training data 104 into milestone-separated intervals of a time series associated with the corresponding entity and then use the time-factored training data to train the machine learning model 108.

In summary, the performance predicting computing system 100 can operate in a training stage to train a machine learning model using extracted entity metadata, generated query intents, and performance results pertaining to selected training entities. The trained machine learning model may then be used in a prediction stage to predict performance of a target entity using extracted entity metadata and generated query intents pertaining to that entity, thereby generating performance results for the target entity. It should be understood that even during the prediction stage, the training may continue using supplemental information about the training entities or feedback on the performance predictions of the target entity.

Figure 2:
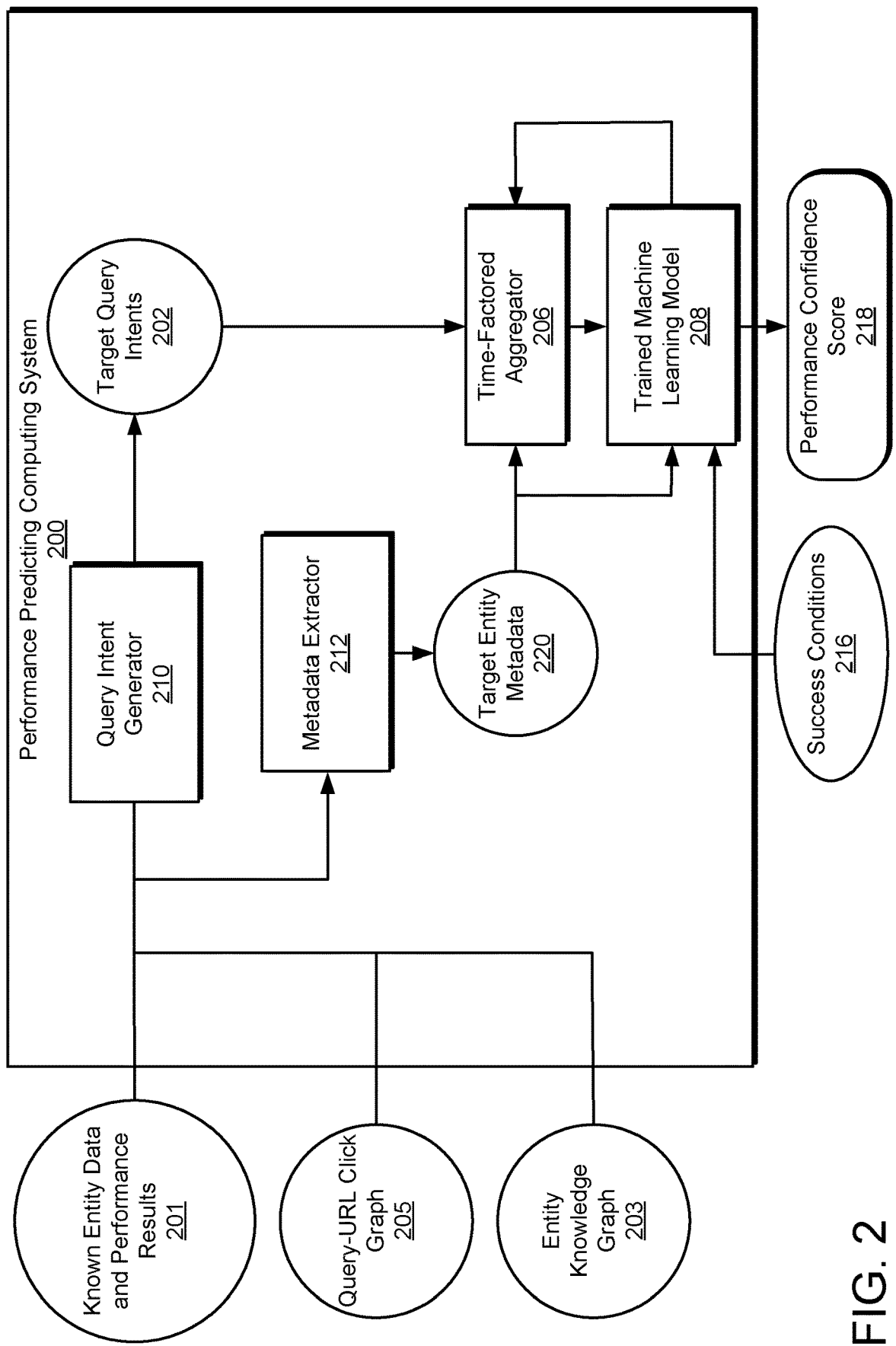
FIG. 2 illustrates a prediction stage of an example performance prediction computing system.

FIG. 2 illustrates a prediction stage of an example performance prediction computing system 200. It should be understood that, in some implementations, the training of the machine learning model described with regard to FIG. 1 may be performed by the same system or by a different system than the performance prediction computing system 200 of FIG. 2. The performance prediction computing system 200 collects and processes observations relating to a target entity by analyzing certain Web behavior, content, and relationships to extract query intents and metadata, relating to the target entity. In machine-learning, the target query intent data are referred to as unlabeled observations.

Web search systems are examples of an information retrieval system to which a user submits a query and obtains a list of results that are relevant to the query. However, web search queries are often ambiguous. Different users may have different query intents for the same or similar queries. The results that are returned from such queries may be relevant to the query intent of one user and relatively irrelevant to the other users. Accordingly, discerning the user query intents for a large set of queries can provide a machine learning model 208 with quantifiable inputs representing user query intents and therefore a semantic understanding of information and user behavior on the Web. For example, using embedding and clustering, user queries may be mapped to multidimensional vectors in a vector space and then clustered into groups of relative similarity to yield query intents as a group of similar vectors. These vector groups, or query intents, can then be input to the machine learning model, along with the performance results (e.g., as labels) to train the machine learning model. The trained machine learning model 208 has been trained, at least in part, using such query intents relative to multiple milestones in the time series.

In a scenario of predicting success of a start-up company, example query intents may include or relate to without limitation press release dates, product or service reviews, funding events, and references to the company in industry literature. In a scenario of predicting success of a new product, example query intents may include or relate to anticipate of product release, product release data, product comparisons in the press, reviews, prices, community "how-to" questions and answers, and company support questions and responses.

In the prediction stage for a target entity, the trained machine learning model 208 may then be used in a prediction stage to predict performance of a target entity using extracted target entity metadata 220 and generated query intents pertaining to that entity, thereby generating performance results for the target entity. The performance predicting computing system 200 collects input from a query-URL click graph 205 to generate query intents for the target entity ("target query intents"). The query intent generator 210 mines ("analyzes and extracts queries from") the query-URL click graph 205 queries relating to the target entity. The query intent generator 210 may also input data from the known entity data and performance results 201 and the entity knowledge graph 203 as supplemental information to the mining operation. The mined queries are converted to multidimensional vectors in a vector space in an embedding operation, and the vectors are clustered to yield groups of vectors referred to as query intents. In the training stage, these are referred to as training query intents. In the prediction stage, these are referred to as target query intents 202.

A metadata extractor 212 extracts target entity metadata pertaining to the target entity from one or more of the known entity data and performance results 201, the query-URL click graph 205 and the entity knowledge graph 203. The metadata may be time-dependent or time-independent. For example, time-independent properties, such as a category and/or a type of company, product, industry, model, geography, etc., can be input directly to the machine learning model 208 without time-factoring by the time-factored aggregator 206.

A time-factored aggregator 206 allocates the target query intents 202 and time-dependent target entity metadata into target intervals in the time series based on the timing of the queries associated with each intent. For each target milestone, the time-factored aggregator 206 inputs to the trained machine learning model 208 target query intents allocated to the target entity in a target time interval before the target milestone. Success conditions 216, specifying conditions that represent success or degrees of success, are also input to the trained machine learning model 208. It should be understood that there may be multiple success conditions for each milestone of a target entity.

Based on its training by the training data from the training entities, the trained machine learning model 208 evaluates for each target milestone whether the corresponding pre-milestone query intents correlate to post-milestone performance by the target entity that satisfies the success condition. The output from the trained machine learning model 208 is a performance confidence score representing the statistical confidence in the satisfaction of the success condition 216 by the target company.

For example, in a start-up company success prediction, a success condition for a target milestone of "end of the second year after first funding round" may specify success as an acquisition of the company at a valuation of X. The performance confidence score 218 represents the likelihood computed by the trained machine learning model 208 that the pre-milestone target query intents for a given milestone will result in post-milestone performance that will satisfy the success condition 216.

Figure 3:
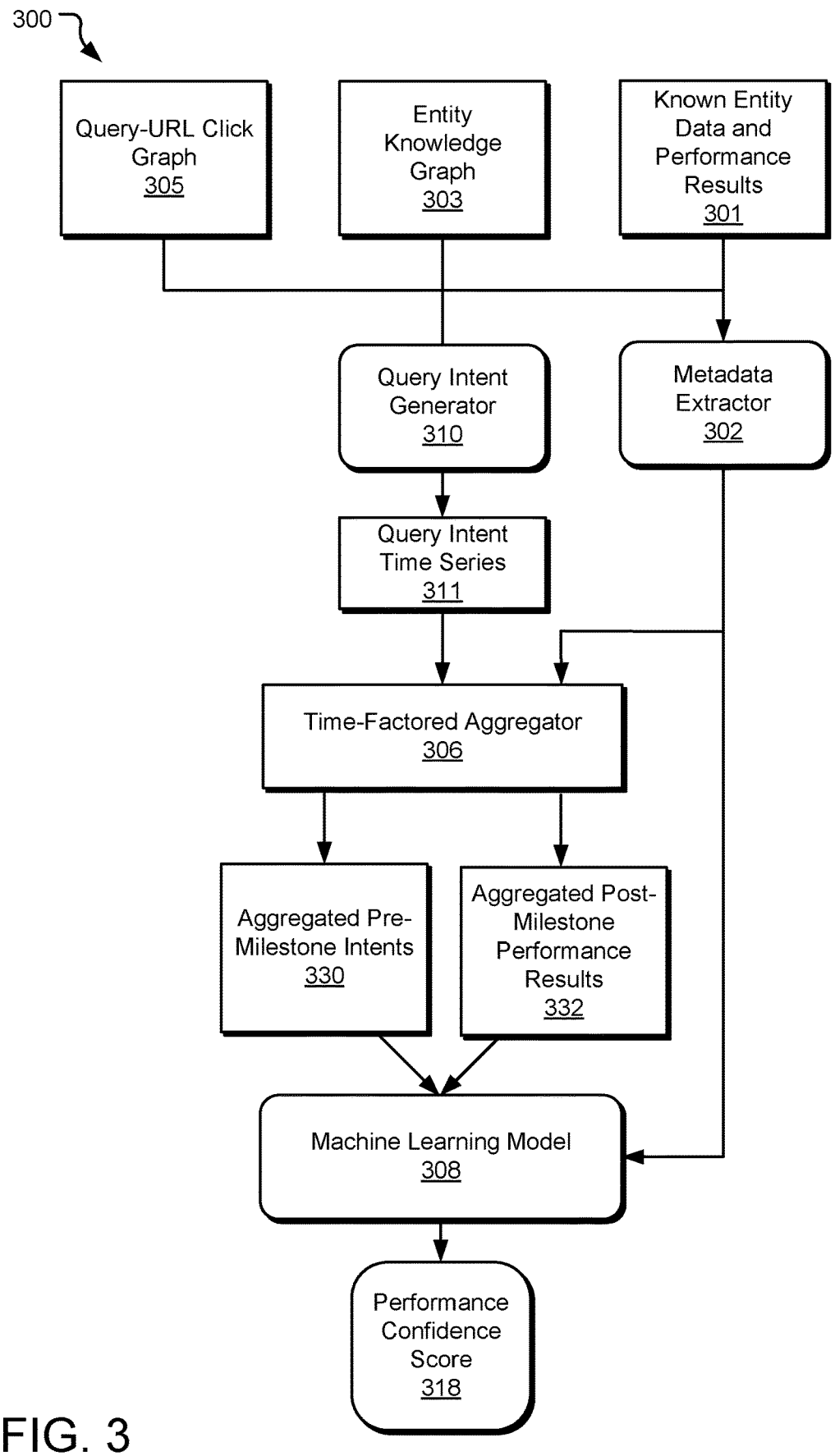
FIG. 3 illustrates a detailed schematic of an example performance prediction computing system.

FIG. 3 illustrates a detailed schematic of an example performance prediction computing system 300. In a training stage, the training query intent time series and time-dependent performance results for multiple training entities are input to a time-factored aggregator 306 and allocated into intervals relative to milestones in order to train a machine learning model 308. In a predicting stage, the query intent time series for the target is input to a time-factored aggregator 306, allocated into intervals relative to milestones, and input to the (trained) machine learning model 308 to predict whether the target entity will satisfy a success condition based on its query intent time series.

As discussed previously, inputs to the performance prediction computing system 300 include known entity data and performance results 301, an entity knowledge graph 303, and a query-URL click graph 305. A query intent generator 310 generates query intents from at least input queries extracted from the query-URL click graph 305. The resulting query intents are distributed along a timeline or time series to yield a query intent time series 311. A metadata extractor 302 may also extract time-dependent or time-independent metadata (e.g., about the training entities or the target entity) from the known entity data and performance results 301, the entity knowledge graph 303, and/or the query-URL click graph 305. For example, the metadata extractor 302 can extract time-dependent performance results from the known entity data and performance results 301 for input to the time-factored aggregator 306 and the machine learning model 308.

During a training stage, a time-factored aggregator 306 receives the query intent time series 311 and time-dependent performance results for the training entities and allocates them in training intervals in the time series relative to a training milestone. For each training milestone, aggregated pre-milestone intents 330 and aggregated post-milestone performance results 332 are submitted to the machine learning model 308 to train the machine learning model 308.

During a prediction stage, the time-factored aggregator 306 receives the query intent time series 311 for the target entity and allocates the query intents to target intervals in the time series relative to a target milestone. For each target milestone, aggregated pre-milestone intents 330 are submitted to the machine learning model 308 to predict whether the target entity will satisfy a success condition based on its query intent time series. Accordingly, in the prediction stage, the machine learning model is being used to determine labels (e.g., "performance results" or the likelihood of achieving performance results that satisfy a success condition) for the pre-milestone observations (e.g., target query intents) of the target entity. The machine learning model 308 outputs a performance confidence score 318 representing the likelihood that the performance result is accurate or the likelihood of achieving performance results that satisfy a success condition.

The term "aggregation" is used to describe the groups of time-proximate query intents collected into individual intervals of the time series. Similarly, the term "allocates" is used to describe the allocation of all query intents into different intervals of the time series. Accordingly, aggregation and allocation, as used herein, are intended to describe different perspectives of the same operation.

Figure 4:
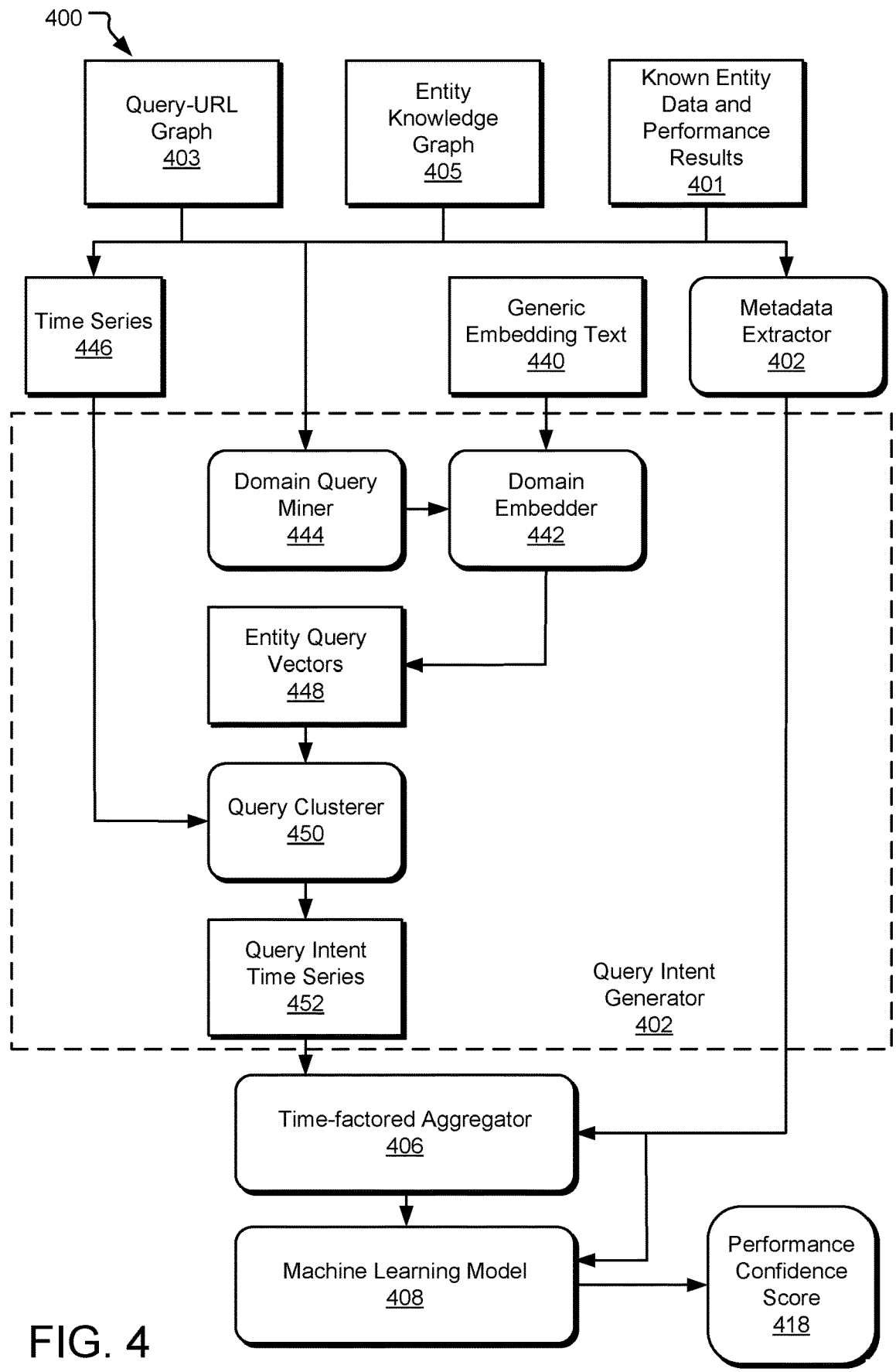
FIG. 4 illustrates a detailed schematic of a query intent generator of an example performance prediction computing system.

FIG. 4 illustrates a detailed schematic of a query intent generator 402 of an example performance prediction computing system 400. As previously discussed, in a training stage, a training query intent time series and time-dependent performance results for multiple training entities are input to a time-factored aggregator 406 and allocated into intervals relative to milestones in order to train a machine learning model 408. In a predicting stage, the query intent time series for the target entity is input to the time-factored aggregator 406, allocated into intervals relative to milestones, and input to the (trained) machine learning model 408 to predict whether the target entity will satisfy a success condition based on its query intent time series. FIG. 4 provides a more detailed description of a query intent generator 402 than provided in FIG. 3.

As discussed previously, inputs to the performance prediction computing system 400 include known entity data and performance results 401, an entity knowledge graph 403, and a query-URL click graph 405. A domain query miner 444 extracts relevant queries from the query-URL click graph 405 (e.g., queries relevant to the training entities in a training stage or queries relevant to the target entity in a prediction stage). For example, if the entities are brands of automobiles, such as Audi, Ford, and Toyota, the domain query miner 444 extracts queries from the query-URL click graph that include the terms Audi, Ford, or Toyota, various models of these companies, and/or related terms or are in the graph proximity of URLs that include these terms or point to content that includes these terms.

Generic embedding data 440 is combined with domain-specific text (not shown) in a domain embedder 442 to convert the mined queries from the domain query miner 444 into multidimensional entity query vectors 448 in a vector space. A timeline or time series 446 is extracted from the include known entity data and performance results 401, the entity knowledge graph 403, and/or the query-URL click graph 405 based on the timing of certain events, queries, etc.

The entity query vectors 448 and the time series 446 are input to a query clusterer 450, which allocates the entity query vectors 448 into groups of relative similarity to yield query intents as a group of similar vectors. The query clusterer 450 also distributes the query intents along the time series 446 to yield a query intent time series 452.

During a training stage, a time-factored aggregator 406 receives the query intent time series 452 and time-dependent performance results for the training entities and allocates them in training intervals in the time series relative to a training milestone. For each training milestone, aggregated pre-milestone intents and aggregated post-milestone performance results are submitted to the machine learning model 408 to train the machine learning model 408.

During a prediction stage, the time-factored aggregator 406 receives the query intent time series 452 for the target entity and allocates the query intents to target intervals in the time series relative to a target milestone. For each target milestone, aggregated pre-milestone intents are submitted to the machine learning model 408 to predict whether the target entity will satisfy a success condition based on its query intent time series. Accordingly, in the prediction stage, the machine learning model is being used to determine labels (e.g., "performance results" or the likelihood of achieving performance results that satisfy a success condition) for the pre-milestone observations (e.g., target query intents) of the target entity. The machine learning model 408 outputs a performance confidence score 418 representing the likelihood that the performance result is accurate or the likelihood of achieving performance results that satisfy a success condition.

Figure 5:
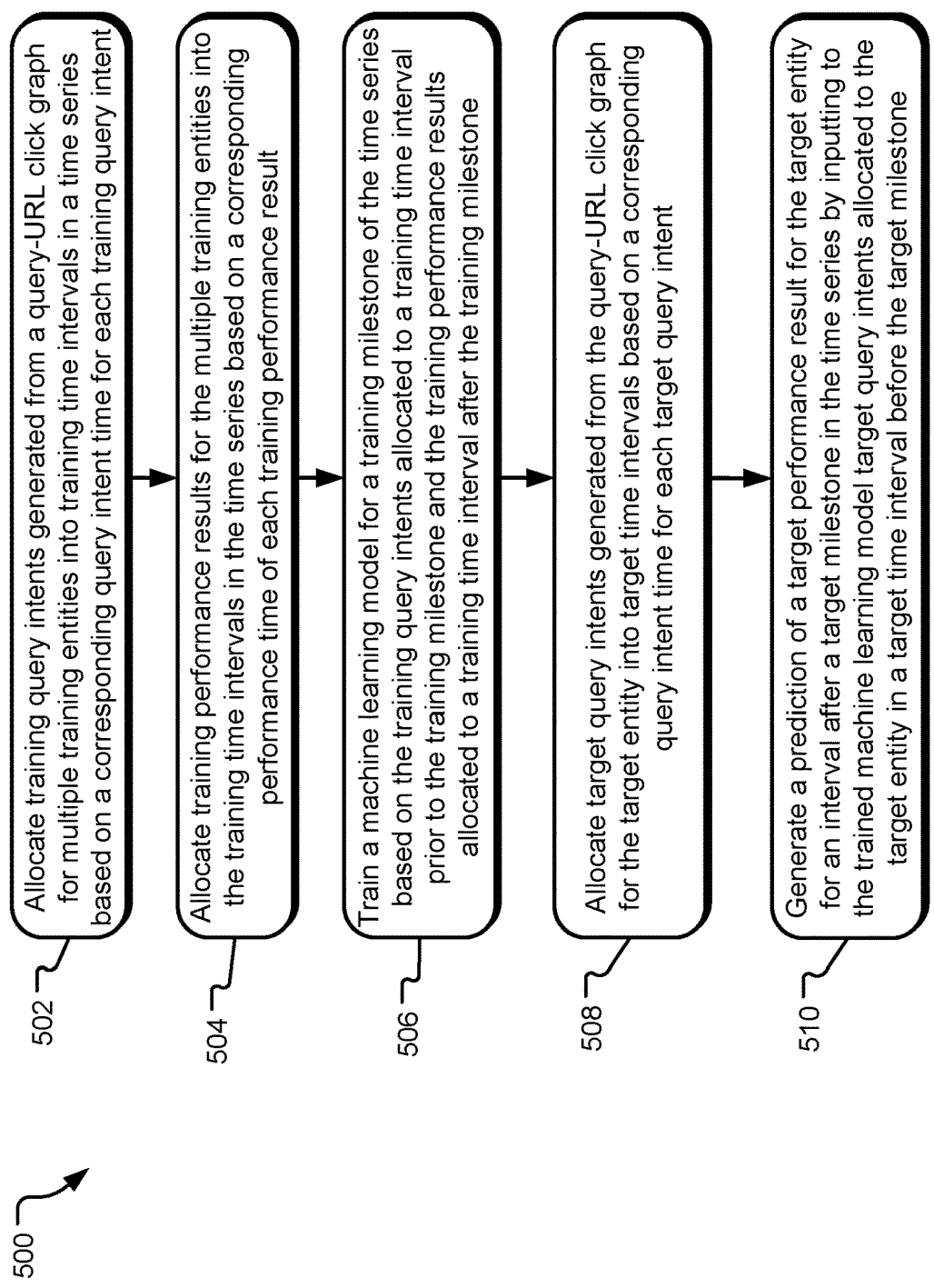
FIG. 5 illustrates example operations for performance prediction.

FIG. 5 illustrates example operations 500 for performance prediction for a target entity. An allocation operation 502 allocates training query intents for multiple training entities into training time intervals in a time series based on a corresponding query intent time for each training query intent. The training query intents are generated from a query-URL click graph. In one implementation, the query intent time includes the time at which a user initiated the search query and/or selected a search result resulting from that query, although other query intent times may be employed.

Another allocation operation 504 allocates training performance results from the multiple training entities into the training time intervals in the time series based on a corresponding performance time of each training performance result. In one implementation, the performance time includes the time at which the performance was measured and/or reported, although other query intent times may be employed.

A training operation 506 trains a machine learning model for a training milestone of the time series based on the training query intents allocated to a training time interval prior to the training milestone and the training performance results allocated to a training time interval after the training milestone.

Yet another allocation operation 508 allocates target query intents generated from the query-URL click graph for the target entity into target time intervals based on a corresponding query intent time for each target query intent. A prediction operation 510 generates a prediction of a target performance result for the target entity for an interval after a target milestone in the time series by inputting to the trained machine learning model target query intents allocated to the target entity in a target time interval before the target milestone.

Figure 6:
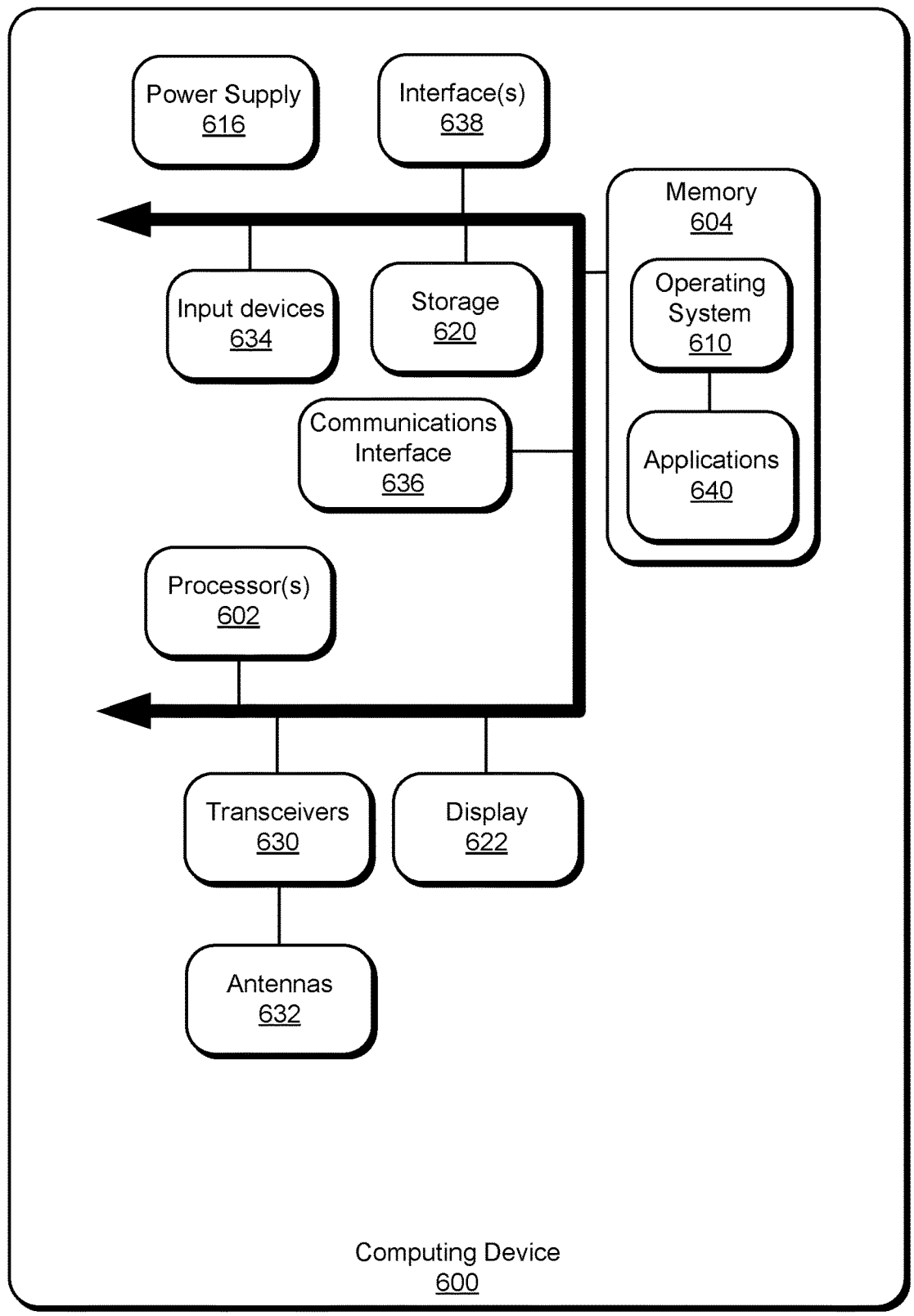
FIG. 6 illustrates an example computing device that may be useful in implementing the described technology to predict performance of a target entity.

FIG. 6 illustrates an example computing device that may be useful in implementing the described technology to predict performance of a target entity. The example computing device 600 may be used to detect the proximity of an object with respect to an antenna, such as inter-application context seeding. The computing device 600 may be a personal or enterprise computing device, such as a laptop, mobile device, desktop, tablet, or a server/cloud computing device. The computing device 600 includes one or more processor(s) 602, and a memory 604. The memory 604 generally includes both volatile memory (e.g., RAM) and non-volatile memory (e.g., flash memory). An operating system 610 and one or more applications 640 may reside in the memory 604 and be executed by the processor(s) 602.

One or more modules or segments, such as a query intent generator, a time-factored aggregator, a machine learning model, a query clusterer, a domain query miner, a domain embedder, a metadata extractor, and other components are loaded into the operating system 610 on the memory 604 and/or storage 620 and executed by the processor(s) 602. Data such a query-URL click graph, an entity knowledge graph, known entity data and performance results, a time series, entity query vectors, a query intent time series, performance confidence scores, and other data and objects may be stored in the memory 604 or storage 620 and may be retrievable by the processor(s). The storage 620 may be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638 such as a serial port interface, parallel port, or universal serial bus (USB). The computing device 600 may further include a display 622 such as a touchscreen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method of predicting performance of a target entity using a machine learning model includes allocating training query intents generated from a query-URL click graph for multiple training entities into training time intervals in a time series based on a corresponding query intent time for each training query intent. The training time intervals in the time series are separated by training milestones in the time series. Training performance results for the multiple training entities are also allocated to the training time intervals in the time series based on a corresponding performance time of each training performance result. The machine learning model is trained for a training milestone of the time series based on the training query intents allocated to a training time interval prior to the training milestone and the training performance results allocated to a training time interval after the training milestone. Target query intents generated from the query-URL click graph for the target entity are allocated into target time intervals based on a corresponding query intent time for each target query intent, the target time intervals in the time series being separated by target milestones in the time series. A prediction of a target performance result for the target entity is generated for an interval after a target milestone in the time series by inputting to the trained machine learning model target query intents allocated to the target entity in a target time interval before the target milestone.

Another example method of any previous method is provided wherein the training query intents are generated from the query-URL click graph by a generating operation that includes selecting the multiple training entities that satisfy a training entity selection condition relative to the target entity, extracting from the query-URL click graph training queries associated with the multiple training entities, embedding the training queries extracted from the query-URL click graph into multidimensional vectors, and clustering the multidimensional vectors into multiple groups, the multidimensional vectors of a first group satisfying a similarity condition for the first group better than the multidimensional vectors of a second group. Each group of multidimensional records constitutes one of the training query intents.

Another example method of any previous method is provided wherein the target query intents are generated from the query-URL click graph by a generating operation that includes extracting from the query-URL click graph target queries associated with the target entity, embedding the target queries extracted from the query-URL click graph into multidimensional vectors, and clustering the multidimensional vectors into multiple groups. The multidimensional vectors of a first group satisfy a similarity condition for the first group better than the multidimensional vectors of a second group. Each group of multidimensional records constitutes one of the target query intents.

Another example method of any previous method is provided wherein the training query intents are generated from a from a query-URL click graph by a generating operation that includes distributing the training query intents in the time series based on time values associated with the training queries.

Another example method of any previous method is provided wherein the operations of allocating training query intents and allocating training performance results are based on metadata extracted from an entity knowledge graph.

Another example method of any previous method is provided wherein the training operation includes training the machine learning model for a different training milestone of the time series based on the allocated training query intents allocated to a different training interval prior to the training milestone and the allocated training performance results allocated to a different training interval after the training milestone.

Another example method of any previous method is provided wherein the training operation includes training the machine learning model using metadata extracted from an entity knowledge graph.

Another example method of any previous method is provided wherein the generating operation includes generating a different prediction of a different target performance result for the target entity for a different target time interval after a different target milestone in the time series by inputting to the trained machine learning model target query intents for the target entity allocated to a different time interval before the different target milestone.

An example computing device for predicting performance of a target entity includes a time-factored aggregator configured to allocate training query intents generated from a query-URL click graph for multiple training entities into training time intervals in a time series based on a corresponding query intent time for each training query intent. The training time intervals in the time series are separated by training milestones in the time series. The time-factored aggregator is also configured to allocate training performance results for the multiple training entities into the training time intervals in the time series based on a corresponding performance time of each training performance result. A machine learning model is configured to receive the allocated training query intents and allocated training performance results. The machine learning model is trained for one or more of the training milestones of the time series based on the training query intents allocated to a training time interval prior to the training milestone and the training performance results allocated to a training time interval after the training milestone. The machine learning model is further configured to generate a prediction of a target performance result for the target entity for an interval after a target milestone in the time series by inputting to the trained machine learning model target query intents allocated to the target entity in a target time interval before the target milestone.

Another example computing device of any previous computing device includes a query intent generator configured to receive and analyze the query-URL click graph and to generate the training query intents by selecting the multiple training entities that satisfy a training entity selection condition relative to the target entity, extracting from the query-URL click graph training queries associated with the multiple training entities, embedding the training queries extracted from the query-URL click graph into multidimensional vectors, and clustering the multidimensional vectors into multiple groups, the multidimensional vectors of a first group satisfying a similarity condition for the first group better than the multidimensional vectors of a second group, each group of multidimensional records constituting one of the training query intents.

Another example computing device of any previous computing device includes a query intent generator configured to receive and analyze the query-URL click graph and to generate the training query intents by extracting from the query-URL click graph target queries associated with the target entity, embedding the target queries extracted from the query-URL click graph into multidimensional vectors, and clustering the multidimensional vectors into multiple groups, the multidimensional vectors of a first group satisfying a similarity condition for the first group better than the multidimensional vectors of a second group, each group of multidimensional records constituting one of the target query intents.

Another example computing device of any previous computing device is provided wherein the training query intents and training performance results are allocated based on metadata extracted from an entity knowledge graph, and the machine learning model is further trained the machine learning model using metadata extracted from an entity knowledge graph.

Another example computing device of any previous computing device is provided wherein the machine learning model is further trained for a different training milestone of the time series based on the allocated training query intents allocated to a different training interval prior to the training milestone and the allocated training performance results allocated to a different training interval after the training milestone.

Another example computing device of any previous computing device is provided wherein the machine learning model is configured to further generate a different prediction of a different target performance result for the target entity for a different target time interval after a different target milestone in the time series by inputting to the trained machine learning model target query intents for the target entity allocated to a different time interval before the different target milestone.

One or more example tangible processor-readable storage media of a tangible article of manufacture encoding processor-executable instructions for executing on an electronic computing system a process of predicting performance of a target entity using a machine learning model. The process includes allocating training query intents generated from a query-URL click graph for multiple training entities into training time intervals in a time series based on a corresponding query intent time for each training query intent. The training time intervals in the time series are separated by training milestones in the time series. The process further includes allocating training performance results for the multiple training entities into the training time intervals in the time series based on a corresponding performance time of each training performance result, training the machine learning model for a training milestone of the time series based on the training query intents allocated to a training time interval prior to the training milestone and the training performance results allocated to a training time interval after the training milestone, allocating target query intents generated from the query-URL click graph for the target entity into target time intervals based on a corresponding query intent time for each target query intent, the target time intervals in the time series being separated by target milestones in the time series, and generating a prediction of a target performance result for the target entity for an interval after a target milestone in the time series by inputting to the trained machine learning model target query intents allocated to the target entity in a target time interval before the target milestone.

One or more other example tangible processor-readable storage media of any preceding media provide a process wherein the training query intents are generated from the query-URL click graph by a generating operation including selecting the multiple training entities that satisfy a training entity selection condition relative to the target entity, extracting from the query-URL click graph training queries associated with the multiple training entities, embedding the training queries extracted from the query-URL click graph into multidimensional vectors, and clustering the multidimensional vectors into multiple groups, the multidimensional vectors of a first group satisfying a similarity condition for the first group better than the multidimensional vectors of a second group, each group of multidimensional records constituting one of the training query intents.

One or more other example tangible processor-readable storage media of any preceding media provide a process wherein the operations of allocating training query intents and allocating training performance results are based on metadata extracted from an entity knowledge graph.

One or more other example tangible processor-readable storage media of any preceding media provide a process wherein the training operation includes training the machine learning model for a different training milestone of the time series based on the allocated training query intents allocated to a different training interval prior to the training milestone and the allocated training performance results allocated to a different training interval after the training milestone.

One or more other example tangible processor-readable storage media of any preceding media provide a process wherein the training operation includes training the machine learning model using metadata extracted from an entity knowledge graph.

One or more other example tangible processor-readable storage media of any preceding media provide a process wherein the generating operation includes generating a different prediction of a different target performance result for the target entity for a different target time interval after a different target milestone in the time series by inputting to the trained machine learning model target query intents for the target entity allocated to a different time interval before the different target milestone.

An example system for predicting performance of a target entity using a machine learning model includes means for allocating training query intents generated from a query-URL click graph for multiple training entities into training time intervals in a time series based on a corresponding query intent time for each training query intent. The training time intervals in the time series are separated by training milestones in the time series. The example system also includes means for allocating training performance results for the multiple training entities into the training time intervals in the time series based on a corresponding performance time of each training performance result, means for training the machine learning model for a training milestone of the time series based on the training query intents allocated to a training time interval prior to the training milestone and the training performance results allocated to a training time interval after the training milestone, and means for allocating target query intents generated from the query-URL click graph for the target entity into target time intervals based on a corresponding query intent time for each target query intent. The target time intervals in the time series are separated by target milestones in the time series. The example system also includes means for generating a prediction of a target performance result for the target entity for an interval after a target milestone in the time series by inputting to the trained machine learning model target query intents allocated to the target entity in a target time interval before the target milestone.

Another example system of any previous system is provided wherein the training query intents are generated from the query-URL click graph by means for generating that include means for selecting the multiple training entities that satisfy a training entity selection condition relative to the target entity, means for extracting from the query-URL click graph training queries associated with the multiple training entities, means for embedding the training queries extracted from the query-URL click graph into multidimensional vectors, and means for clustering the multidimensional vectors into multiple groups. The multidimensional vectors of a first group satisfy a similarity condition for the first group better than the multidimensional vectors of a second group. Each group of multidimensional records constitutes one of the training query intents.

Another example system of any previous system is provided wherein the target query intents are generated from the query-URL click graph by means for generating that include means for extracting from the query-URL click graph target queries associated with the target entity, means for embedding the target queries extracted from the query-URL click graph into multidimensional vectors, and means for clustering the multidimensional vectors into multiple groups. The multidimensional vectors of a first group satisfy a similarity condition for the first group better than the multidimensional vectors of a second group. Each group of multidimensional records constitutes one of the target query intents.

Another example system of any previous system is provided wherein the training query intents are generated from a from a query-URL click graph by means for generating that include means for distributing the training query intents in the time series based on time values associated with the training queries.

Another example system of any previous system is provided wherein the means for allocating training query intents and means for allocating training performance results are based on metadata extracted from an entity knowledge graph.

Another example system of any previous system is provided wherein the means for training include means for training the machine learning model for a different training milestone of the time series based on the allocated training query intents allocated to a different training interval prior to the training milestone and the allocated training performance results allocated to a different training interval after the training milestone.

Another example system of any previous system is provided wherein the means for training include means for training the machine learning model using metadata extracted from an entity knowledge graph.

Another example system of any previous system is provided wherein the means for generating include means for generating a different prediction of a different target performance result for the target entity for a different target time interval after a different target milestone in the time series by inputting to the trained machine learning model target query intents for the target entity allocated to a different time interval before the different target milestone.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of predicting performance of a target entity using a trained machine learning model, the method comprising:

allocating target query intents generated from a query-URL click graph for the target entity into target time intervals based on a corresponding query intent time for each target query intent, the target time intervals being allocated in a time series and separated by target milestones in the time series, wherein the target milestones represent occurrences of predefined types of temporally related events that influence performance of the target entity;

and generating, by the trained machine learning model, a prediction of a target performance result for the target entity for a time interval after a target milestone in the time series by inputting, to the trained machine learning model, target query intents allocated to the target entity in a target time interval before the target milestone, wherein the trained machine learning model is trained for a training milestone of the time series based on one or more training query intents selected from training query intents allocated to a training time interval prior to a time of the training milestone and one or more training performance results selected from training performance results allocated to a training time interval after the time of the training milestone, wherein the training query intents are generated from the query-URL click graph for multiple training entities and are allocated into training time intervals in a time series based on a corresponding query intent time for each training query intent, the training performance results for the multiple training entities are allocated to the training time intervals in the time series based on a corresponding performance time of each training performance result, the training time intervals in the time series are separated by training milestones in the time series, and the training milestones represent occurrences of predefined types of temporally related events that influence performance of the multiple training entities.

2. The method of claim 1, wherein the training query intents are generated from the query-URL click graph, multiple training entities that satisfy a training entity selection condition relative to the target entity are selected, training queries associated with the selected multiple training entities are extracted from the query-URL click graph, the training queries extracted from the query-URL click graph are embedded into multidimensional vectors, and the multidimensional vectors are clustered into multiple groups, the multidimensional vectors of a first group having greater similarity amongst themselves as defined by a similarity condition for the first group than the multidimensional vectors of a second group, each group of multidimensional records constituting one of the training query intents.

3. The method of claim 1, wherein the target query intents are generated from the query-URL click graph, target queries associated with the target entity are extracted from the query-URL click graph, the target queries extracted from the query-URL click graph are embedded into multidimensional vectors, and the multidimensional vectors clustered into multiple groups, the multidimensional vectors of a first group having greater similarity amongst themselves as defined by a similarity condition for the first group than the multidimensional vectors of a second group, each group of multidimensional records constituting one of the target query intents.

4. The method of claim 1, wherein the training query intents are generated from the query-URL click graph and distributed in the time series based on time values associated with training queries.

5. The method of claim 1, wherein the training query intents and the training performance results are allocated based on metadata extracted from an entity knowledge graph, and the trained machine learning model is further trained using metadata extracted from an entity knowledge graph.

6. The method of claim 1 wherein the generating operation comprises:
generating a different prediction of a different target performance result for the target entity for a different target time interval after a different target milestone in the time series by inputting to the trained machine learning model target query intents for the target entity allocated to a different time interval before the different target milestone.

7. A computing device for predicting performance of a target entity, the computing device comprising:
one or more hardware processors;
a time-factored aggregator executable by the one or more hardware processors and configured to allocate target query intents generated from a query-URL click graph for the target entity into target time intervals based on a corresponding query intent time for each target query intent, the target time intervals being allocated in a time series and separated by target milestones in the time series, wherein the target milestones represent occurrences of predefined types of temporally related events that influence performance of the target entity;
and a trained machine learning model executable by the one or more hardware processors and configured to generate a prediction of a target performance result for the target entity for a time interval after a target milestone in the time series by inputting, to the trained machine learning model, target query intents allocated to the target entity in a target time interval before the target milestone, wherein the trained machine learning model is trained for a training milestone of the time series based on one or more training query intents selected from training query intents allocated to a training time interval prior to a time of the training milestone and one or more training performance results selected from training performance results allocated to a training time interval after the time of the training milestone, wherein the training query intents are generated from the query-URL click graph for multiple training entities and are allocated into training time intervals in a time series based on a corresponding query intent time for each training query intent, the training performance results for the multiple training entities are allocated to the training time intervals in the time series based on a corresponding performance time of each training performance result, the training time intervals in the time series are separated by training milestones in the time series, and the training milestones represent occurrences of predefined types of temporally related events that influence performance of the multiple training entities.

8. The computing device of claim 7, further comprising:
a query intent generator executable by the one or more hardware processors and configured to receive and analyze the query-URL click graph, wherein the training query intents are generated from a selection of multiple training entities that satisfy a training entity selection condition relative to the target entity, training queries associated with the multiple training entities are extracted from the query-URL click graph, the training queries extracted from the query-URL click graph are embedded into multidimensional vectors, and the multidimensional vectors are clustered into multiple groups, the multidimensional vectors of a first group having greater similarity amongst themselves as defined by a similarity condition for the first group than the multidimensional vectors of a second group, each group of multidimensional records constituting one of the training query intents.

9. The computing device of claim 7, further comprising:
a query intent generator executable by the one or more hardware processors and configured to receive and analyze the query-URL click graph, wherein the training query intents generated from the query-URL click graph by extraction of target queries associated with the target entity, the target queries extracted from the query-URL click graph are embedded into multidimensional vectors, and the multidimensional vectors are clustered into multiple groups, the multidimensional vectors of a first group having greater similarity amongst themselves as defined by a similarity condition for the first group than the multidimensional vectors of a second group, each group of multidimensional records constituting one of the target query intents.

10. The computing device of claim 7, wherein the training query intents and training performance results are allocated based on metadata extracted from an entity knowledge graph, and the trained machine learning model is further trained using metadata extracted from an entity knowledge graph.

11. The computing device of claim 7, wherein the trained machine learning model is further trained for a different training milestone of the time series based on the training query intents are allocated to a different training interval prior to the training milestone and the training performance results are allocated to a different training interval after the training milestone.

12. The computing device of claim 7, wherein the trained machine learning model is configured to further generate a different prediction of a different target performance result for the target entity for a different target time interval after a different target milestone in the time series by inputting to the trained machine learning model target query intents for the target entity allocated to a different time interval before the different target milestone.

13. One or more tangible processor-readable storage media of a tangible article of manufacture encoding processor-executable instructions for executing on an electronic computing system a process of predicting performance of a target entity using a trained machine learning model, the process comprising:
    allocating target query intents generated from a query-URL click graph for the target entity into target time intervals based on a corresponding query intent time for each target query intent, the target time intervals being allocated in a time series and separated by target milestones in the time series, wherein the target milestones represent occurrences of predefined types of temporally related events that influence performance of the target entity;
    and generating, by the trained machine learning model, a prediction of a target performance result for the target entity for a time interval after a target milestone in the time series by inputting to the trained machine learning model target query intents allocated to the target entity in a target time interval before the target milestone, wherein the trained machine learning model is trained for a training milestone of the time series based on one or more training query intents selected from training query intents allocated to a training time interval prior to a time of the training milestone and one or more training performance results selected from training performance results allocated to a training time interval after the time of the training milestone, wherein the training query intents are generated from the query-URL click graph for multiple training entities and are allocated into training time intervals in a time series based on a corresponding query intent time for each training query intent, the training performance results for the multiple training entities are allocated to the training time intervals in the time series based on a corresponding performance time of each training performance result, the training time intervals in the time series are separated by training milestones in the time series, and the training milestones represent occurrences of predefined types of temporally related events that influence performance of the multiple training entities.

14. The one or more tangible processor-readable storage media of claim 13, wherein the training query intents are generated from the query-URL click graph, multiple training entities that satisfy a training entity selection condition relative to the target entity are selected, training queries associated with the selected multiple training entities are extracted from the query-URL click graph, the training queries extracted from the query-URL click graph are embedded into multidimensional vectors, and the multidimensional vectors are clustered into multiple groups, the multidimensional vectors of a first group having greater similarity amongst them selves as defined by a similarity condition for the first group than the multidimensional vectors of a second group, each group of multidimensional records constituting one of the training query intents.

15. The one or more tangible processor-readable storage media of claim 13, wherein the target query intents are generated from the query-URL click graph, target queries associated with the target entity are extracted from the query-URL click graph, the target queries extracted from the query-URL click graph are embedded into multidimensional vectors, and the multidimensional vectors clustered into multiple groups, the multidimensional vectors of a first group having greater similarity amongst them selves as defined by a similarity condition for the first group than the multidimensional vectors of a second group, each group of multidimensional records constituting one of the target query intents.

16. The one or more tangible processor-readable storage media of claim 13, wherein the training query intents are generated from the query-URL click graph and distributed in the time series based on time values associated with training queries.

17. The one or more tangible processor-readable storage media of claim 13, wherein the generating operation comprises: generating a different prediction of a different target performance result for the target entity for a different target time interval after a different target milestone in the time series by inputting to the trained machine learning model target query intents for the target entity allocated to a different time interval before the different target milestone.

* * * * *